F. BODÉ.
LIQUID GAGE AND MORE PARTICULARLY WATER GAGE FOR STEAM BOILERS.
APPLICATION FILED MAR. 20, 1914.
1,201,140.  Patented Oct. 10, 1916.
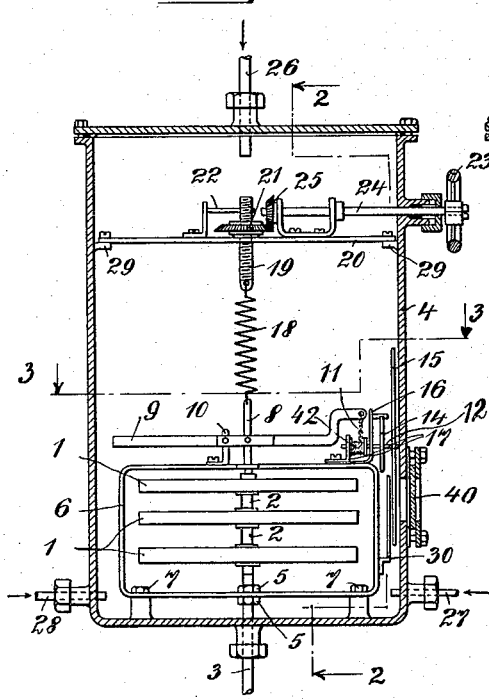
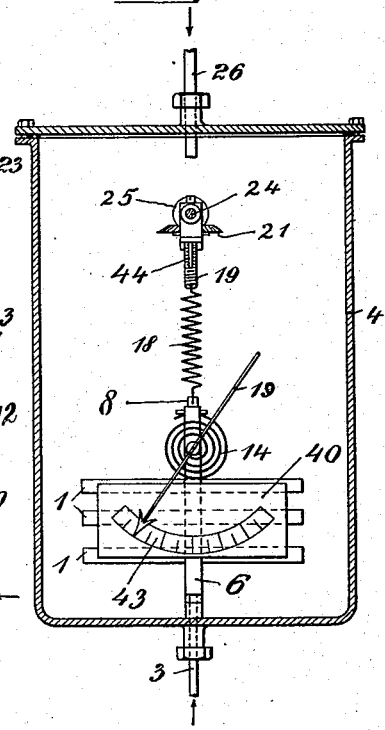
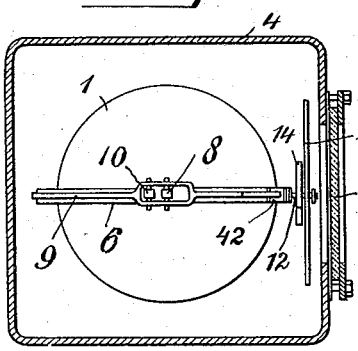
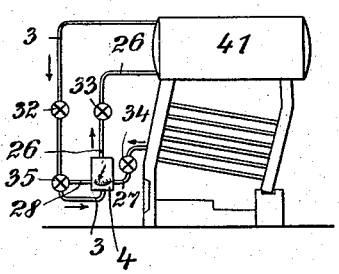
Witnesses:
R. Dommers
E. Leckert
Inventor.
Ferdinand Bodé
By [signature]
Atty.

UNITED STATES PATENT OFFICE.

FERDINAND BODÉ, OF SPANDAU, GERMANY.

LIQUID-GAGE AND MORE PARTICULARLY WATER-GAGE FOR STEAM-BOILERS.

1,201,140. Specification of Letters Patent. Patented Oct. 10, 1916.

Application filed March 20, 1914. Serial No. 826,049.

*To all whom it may concern:*

Be it known that I, FERDINAND BODÉ, a citizen of the German Empire, residing at Spandau, Germany, have invented certain new and useful Improvements in Liquid-Gages and More Particularly in Water-Gages for Steam-Boilers; and I do hereby declare the following to be a full, clear, and exact description of the invention, such as will enable other skilled in the art to which it appertains to make and use the same.

My invention relates to improvements in liquid gages and more particularly in water gages for steam boilers.

The object of the improvements is to provide a liquid gage which can be disposed at any desired height and at a distance from the receptacle containing the liquid.

With this object in view my invention consists in connecting a suitable pressure gage through a column of liquid and a column of a gaseous fluid with the receptacle and measuring the difference of the pressures transmitted by the said column of liquid and the column of gaseous fluid to the apparatus. This difference is equal to the static pressure of the column of liquid independendently of the fluid pressure within the receptacle, and it indicates the height of the column and therefore the level of the liquid.

In the practice of the invention I prefer to provide a pressure member such as a diaphragm which is acted upon at one side by the column of the liquid and at the opposite side by the column of gaseous fluid, and to connect the said pressure member with an indicating device. The said diaphragm and indicating device provide a differential pressure gage which indicates the difference of the pressure of the column of liquid plus the pressure within the receptacle on the one hand and the pressure of the fluid within the receptacle on the other hand, which difference is equal to the pressure caused by the weight of the column of liquid independently of the pressure within the receptacle, the effect of the pressure within the receptacle being balanced by acting on the pressure member in opposite directions. Therefore the gage is made independent of the pressure and the variations of the pressure within the receptacle.

In order that the invention be more clearly understood an example embodying the same has been shown in the accompanying drawing, in which the same letters of reference have been used in all the views to indicate corresponding parts.

In said drawing—Figure 1, is a vertical section of the gage, Fig. 2, is a cross-section of the apparatus taken on the line 2—2 of Fig. 1 and showing the indicating apparatus, Fig. 3, is a horizontal section taken on the line 3—3 of Fig. 1, Fig. 4, is a diagrammatical view showing the manner of using the apparatus in connection with a steam boiler.

In explaining the invention reference will be had to a water gage for steam boilers. But I wish it to be understood, that my invention is not limited to the use in connection with a steam boiler, and that my improved gage may be used for indicating the level of the liquid within other receptacles.

Referring to the example illustrated in the drawing the improved apparatus consists of a casing 4 which is closed in an air tight manner and incloses a suitable pressure gage. As shown the said pressure gage consists of a plurality of superposed hollow shells 1 connected with each other by tubes 2. To the shells 1 a pipe 3 is connected which communicates with the steam chamber of the boiler 41. The shells 1 are disposed within a frame 6 preferably in the form of a rectangular bail, and adapted to limit the expansion of the shells and to protect the same against non-elastic deformation in case of excessive pressure of the steam. The casing 4 communicates through a pipe 26 with the upper part or steam chamber of the steam boiler 41, and it communicates through a pipe 27 with the lower part or water chamber of the steam boiler, so that the receptacle 4 is a part of a liquid column communicating with the boiler. The lower part of the casing 4 is connected with a steam pipe 28 which is branched from the steam pipe 3. The object of this pipe will hereafter be explained.

In the operation of the apparatus the outside of the shells 1 is under the pressure of the column of water within the pipes 26 and 27 and of the steam within the boiler. The steam also acts through the steam pipe 3 and within the shells 1, so that the steam pressure which acts on the inner and outer sides of the shells is balanced, and only the pressure of the column of liquid has a deforming effect on the walls of the shells. The pressure of the column of liquid depends on the height of the said column, and the shells are compressed or expanded according to the variations of the said pressure. The deformations of the shells are transmitted by a rod 8 to a lever 9 which has a rocking support in a bearing 10 and is adapted to transmit its movement through a chain 11 and a drum 42 to a shaft 12 carrying a hand 15. The said shaft is connected with a spiral spring 14. The hand 15 is disposed within the casing 4 and it coöperates with scale marks 43 which can be inspected from without through a peep hole closed by a glass plate 40.

In order that the hand and the parts connected therewith can easily be adjusted, the rod 8 is connected with a spring 18 which is suspended from a screw-threaded rod 19. The said rod is engaged by a bevel gearing 21 having a central screw-threaded bore and adapted to be turned by means of an outer setting wheel 23, a shaft 24, and a bevel gear wheel 25. The rod 19 is slitted at its upper end and through the said slit a pin 22 is passed which is adapted to prevent rotation of the rod 19 and to permit longitudinal displacement thereof by means of the bevel gear wheel 21 being turned. By shifting the rod 19 in longitudinal direction the tension of the spring 18 is increased or reduced, whereby the position of the hand 15 is adjusted independently of the pressure acting on the shells 1. The bevel gearings 21 and 25, the pin 22, and the shaft 24 are supported on a transverse plate 20 secured to the wall of the casing 4 at 29.

In order to protect the shells 1 as against destruction by excessive pressure when starting the operation of the same, a two-way cock 35 is provided in the steam pipe 3 and the said two-way cock is connected to the branch pipe 28. Before opening the steam valve 32 the two-way cock 35 is set in such a way, that it connects the lower part of the pipe 3 and the pipe 28 to the steam supply. If thereafter the valve 32 is opened the steam flows as well through the pipe 3 and to the shells 1 as through the pipe 28 and into the casing 4 inclosing the shells 1. Thereby the shells 1 are at first subjected at both sides to the same pressure. If thereafter the valves 33 and 34 are opened and water is admitted to the casing 4 it finds therein the pressure of the steam, so that the pressure on the shells 1 is increased only in a degree corresponding to the height of the column of water. After the water has thus been admitted the two-way cock 35 is set in such a way, that the steam supply through the pipe 28 is disconnected from the boiler and only the shells 1 are connected with the steam chamber of the boiler through the pipe 3. Thereupon the apparatus is ready for indicating the level of the water within the boiler.

While in describing the invention reference has been made to an apparatus in which the steam chamber of the boiler is connected with the shells 1, I wish it to be understood, that my invention is not limited to this feature, and that the apparatus may also be used in such a way, that the hollow of the shells 1 is connected with the liquid chamber of the boiler, while the hollow of the casing 4 is connected with the steam chamber. The operation of the apparatus is substantially the same as has been described before, the difference residing only in the fact, that in one case the shells 1 are compressed by the weight of the column of liquid which acts thereon from without, while in the other case the shells are expanded by the pressure of the column of liquid acting thereon from within. This difference has an effect only on the displacement of the hand which must be arranged accordingly.

In the example described herein the shells 1 provide a diaphragm which is acted upon from opposite sides. It will readily be understood that my invention is not limited to this feature and that in lieu of a single diaphragm two diaphragms may be used which act in opposition to each other.

In describing the invention reference has been made to an arrangement in which the differential pressure gage is disposed below the boiler, so that the column of liquid acts on the diaphragm or shells 1 by positive pressure. But I wish it to be understood, that my invention is not limited to this feature, and that the casing 4 and shells 1 may be disposed above the boiler or other receptacle containing a liquid, in which case the column of liquid acts by negative pressure or suction. In using herein and in the claims the word pressure I wish it to be understood, that such pressure may either be positive pressure or negative pressure or suction.

I claim herein as my invention:

1. In an apparatus for indicating the level of a liquid under pressure, the combination with a vessel containing said liquid, of a differential pressure gage comprising a casing communicating with said vessel above and below the surface of the liquid, a deformable shell within the casing and communicating with the vessel above the liquid, and means controlled by the shell to indicate the difference of pressure within and without the shell.

2. In an apparatus for indicating the level of a liquid under pressure, the combination with a vessel containing said liquid, of a casing, an elastic shell within the casing, means to simultaneously connect the casing and shell with the vessel above the liquid, thereby subjecting the shell to the same pressure within and without, means to connect the casing to a column of liquid connected with the liquid within the vessel, thereby increasing the pressure on the shell corresponding to the height of the column of liquid, the first of said connecting means including means to disconnect the casing and vessel above the liquid, and means controlled by the shell to indicate the difference of pressure thereon.

3. In an apparatus for indicating the level of a liquid under pressure, the combination with a vessel containing said liquid, of a casing, an elastic shell within the casing, means to simultaneously connect the casing and shell with the vessel above the liquid, thereby subjecting the shell to the same pressure within and without, means to connect the casing to the vessel above and below the surface of the liquid, thereby increasing the pressure on the shell corresponding to the height of the column of liquid, and means controlled by the shell to indicate the differential pressure.

4. In an apparatus for indicating the level of a liquid under pressure, the combination with a vessel containing said liquid, of a casing, an elastic shell within said casing, means to connect the vessel above the liquid with the shell or with the shell and casing simultaneously, means to connect the casing with the liquid within the vessel, and means controlled by the shell for indicating the difference of pressure within and without the shell.

In testimony whereof I hereunto affix my signature in the presence of two witnesses.

FERDINAND BODÉ.

Witnesses:
  HENRY HASPER,
  WOLDEMAR HAUPT.

Copies of this patent may be obtained for five cents each, by addressing the "Commissioner of Patents. Washington, D. C."